Feb. 6, 1968 W. A. BISHOP. SR 3,367,038
METHOD AND APPARATUS FOR MOISTURE DETECTION, MONITORING AND
CONTROL IN DRYING MATERIALS
Filed March 18, 1965 2 Sheets-Sheet 1
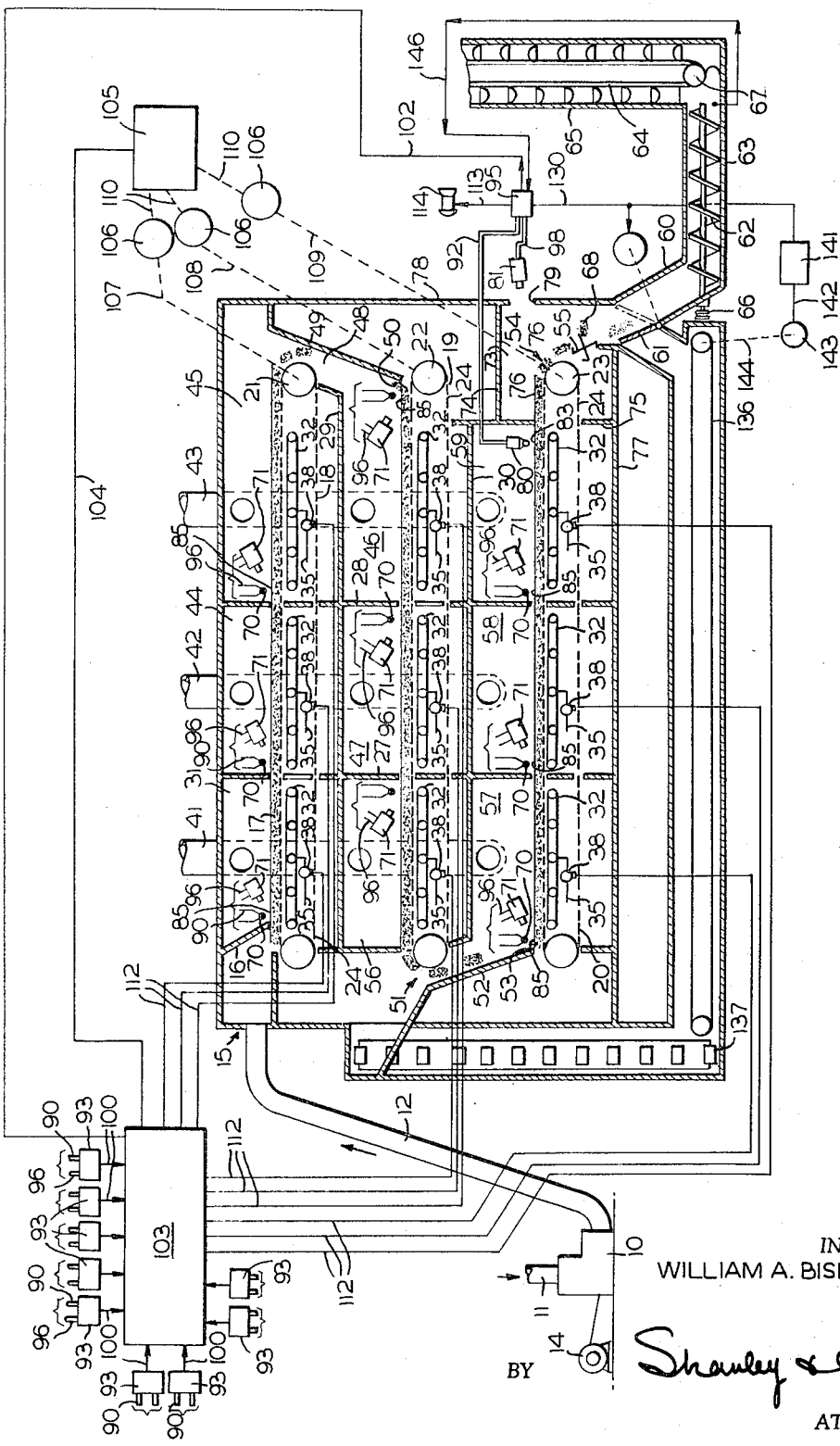
Fig.1.
INVENTOR
WILLIAM A. BISHOP, Sr.
BY 
ATTORNEYS

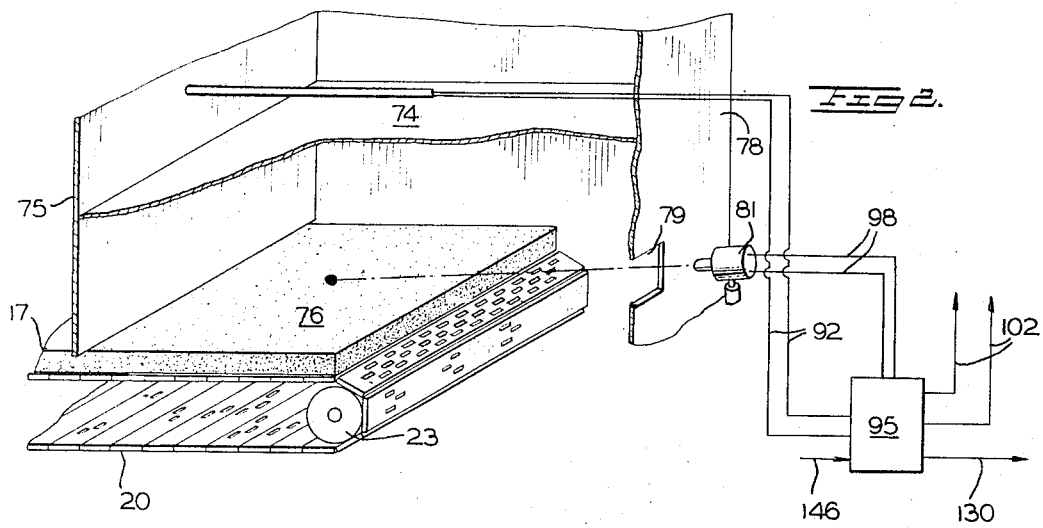
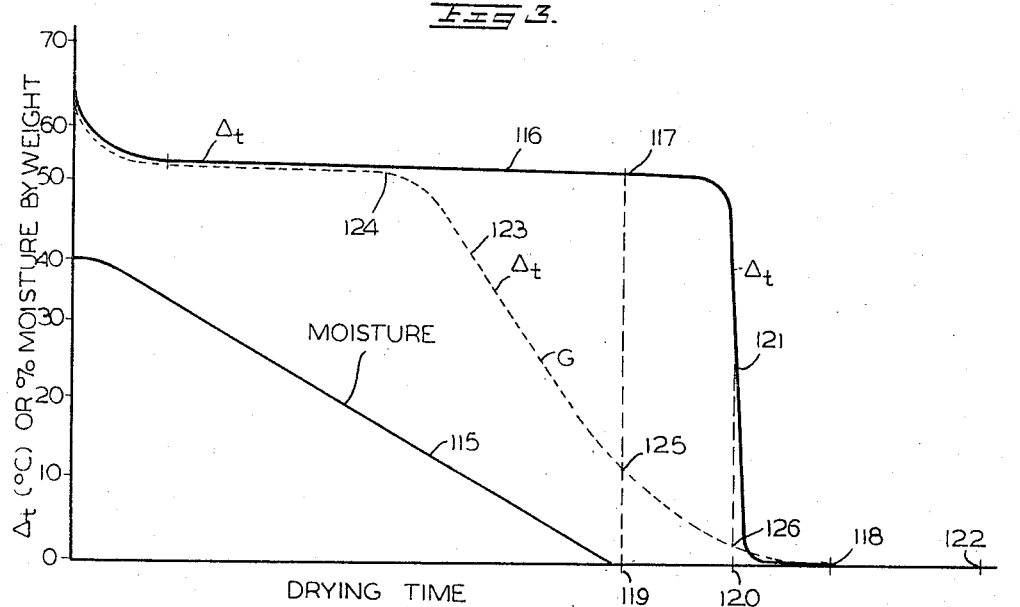

United States Patent Office 3,367,038
Patented Feb. 6, 1968

3,367,038
METHOD AND APPARATUS FOR MOISTURE
DETECTION, MONITORING AND CONTROL
IN DRYING MATERIALS
William A. Bishop, Sr., Baton Rouge, La., assignor to
Copolymer Rubber and Chemical Corporation, a corporation of Louisiana
Filed Mar. 18, 1965, Ser. No. 440,902
21 Claims. (Cl. 34—31)

ABSTRACT OF THE DISCLOSURE

Wet synthetic rubber is dried with a heated gaseous medium using a novel method and improved apparatus wherein the rubber and gaseous medium are contacted, the temperature is measured, and the temperature of the rubber and preferably the temperature differential between the rubber and the gaseous medium contacted therewith is used for detecting, monitoring and controlling the moisture content.

This invention relates to a novel method and improved apparatus for detecting and monitoring moisture in materials as they are being dried. The invention further relates to a novel method and improved apparatus for controlling the moisture content of materials which are being dried.

The method and apparatus of the present invention will be illustrated and described hereinafter with specific reference to the detection, monitoring and control of moisture in the drying of synthetic rubber crumb. However, it will be recognized by those skilled in the art that the method and apparatus of the present invention may be used in drying other materials.

In preparing synthetic rubber by an emulsion polymerization process, the resulting latex is stripped of unreacted monomer and then coagulated to produce crumb rubber. The washed wet synthetic rubber crumb is passed continuously through driers where it is dried to a low moisture content such as 0.5% or lower, and preferably below 0.2%, and baled. In instances where it is desired to produce a high quality, low moisture containing product using a minimum drying time, it is necessary to provide some means for continuously determining the moisture content of the dried rubber. One method which has been proposed heretofore is to monitor the moisture content of each individual bale of synthetic rubber as it is being passed to the packaging station. However, in such instances wet rubber is detected after baling and it is necessary to reject the bale and reduce it to small particles of rubber satisfactory for recycling to the drier for additional drying. This is an expensive, inefficient, time-consuming operation which interferes with normal production and a more efficient method has been long sought.

The synthetic rubber industry has long experienced difficulties in detecting, monitoring and controlling moisture in the drying of synthetic rubber. In an effort to have as little wet rubber as possible, it has been the practice to dry the rubber crumb for a period of time after the desired moisture content is normally reached in order to compensate for variables in the drying step and thereby eliminate as many isolated wet spots as possible. The additional drying time necessary to reduce wet rubber production in accordance with prior art practice often results in the rubber being held at an elevated temperature which may be much higher than earlier in the drying process when a substantial amount of water is present. Since hot air is normally passed through the driers, it is possible for the rubber to be deleteriously affected by the elevated temperature and/or the oxygen content of the air. Thus, the quality of the rubber may be lowered due to the prolonged drying time which is not necessary for most of the output.

The present invention overcomes the disadvantages of the prior art and provides for the first time an entirely satisfactory method and apparatus for detecting, monitoring and/or controlling the moisture content of the rubber. It is possible to dry the wet rubber crumb only for the necessary period of time to arrive at a desired predetermined moisture content, and any isolated wet spot in the rubber may be rejected prior to baling and while it is still in the form of rubber crumb and recycled to the drier for further drying. Thus, the output of a given prior art drier may be increased substantially as the usual period of overdrying for normal production is not necessary and the expense of disintegrating wet bales of rubber is eliminated.

It is an object of the present invention to provide a novel method and apparatus for detecting and monitoring moisture in materials as they are being dried.

It is still a further object to provide a novel method and improved apparatus for controlling the moisture content of materials which are being dried.

It is still a further object to provide a novel method and improved apparatus for detecting and monitoring moisture in the drying of synthetic rubber.

It is still a further object to provide a novel method and apparatus for controlling the moisture content of synthetic rubber as it is being dried.

Still other objects of the invention and the attendant advantages thereof will be apparent to those skilled in the art upon reference to the following detailed description, and the drawings, wherein:

FIGURE 1 is a view, partially in cross section, diagrammatically illustrating one suitable arrangement of apparatus for practicing the invention;

FIGURE 2 is a detailed view, partially in cross section and with portions thereof being broken away, taken along the lines 2—2—2—2 of FIGURE 1 illustrating the arrangement of the thermocouples, optical pyrometers and associated apparatus of FIGURE 1; and FIGURE 3 graphically illustrates the manner in which $\Delta t$ and moisture content may vary with the drying time of relatively porous and relatively nonporous synthetic rubber crumb.

Referring now to FIGURES 1 and 2 of the drawings, dewatered but wet synthetic rubber crumb from a prior art process for the coagulation of latex is passed to hammer mill 10 via chute 11 where it is reduced to a fine particle size and then blown upward through chute 12 by means of blower 14 into drier 15. The rubber crumb strikes baffle 16 and is deposited in the form of a layer of synthetic rubber crumb 17 on the perforated trays of conveyor or drier flight 18.

The drier 15 may be constructed in accordance with prior art practice except as noted hereinafter to provide the improvements of the invention. It may include, for example, a series of three, vertically spaced, horizontally extending, conveyors or drier flights 18, 19 and 20, which may be mounted on and driven by rollers 21, 22 and 23, respectively. The drier 15 also may be provided with two vertically extending baffles 27 and 28, and two horizontally extending baffles 29 and 30 which divide the drier into a series of nine drier zones 31, 44–47 and 56–59. A header 32 is provided in each of the drier zones and a suitable relatively dry, hot gaseous medium such as air may be fed to each of the drier zones therethrough. The headers 32 are supplied with the gaseous medium by means of conduits 35 at rates controlled by remote control valves 38. The gaseous medium supplied to each drier zone passes upward through the perforated drier trays 24 and through the layer 17 of rubber crumb thereon, and it is then withdrawn from the drier zones 31, 56 and 57 via conduit 41, from drier zones 44, 47 and 48 via conduit 42, and from drier zones 45, 46 and 59 via conduit 43.

The drier flight 18 is moved horizontally through the drier 15 in the direction of the arrow by driving means 21 and the layer of rubber crumb 17 supported thereby is likewise moved horizontally. As the rubber crumb passes through the drier zones 31, 44 and 45, the hot, relatively dry air heats it, thereby evaporating moisture. Upon reaching the point indicated at 48, the partially dried rubber crumb drops downward and strikes baffle 49 and is deflected onto drier flight 19, which is moved by driving means 22 horizontally along the length of the drier but in a direction opposite to that of conveyor 18. The partially dried rubber falls onto the conveyor 19 at the point indicated at 50 and travels transversely through the drier zones 46, 47 and 56 until it reaches the point indicated at 51, where it falls downward onto baffle 52 which guides and deposits it onto drier flight 20 at the point indicated at 53. The drier flight 20 is driven by driving means 23 in a direction opposite to conveyor 19 and the layer of rubber 17 resting thereon is passed through drier zones 57, 58 and 59. When the layer of rubber 17 resting upon the drier flight 20 reaches the point indicated at 54, it is normally dried to a satisfactory moisture content and falls from conveyor 20 onto disintegrator 55 which breaks it into sufficiently small pieces for convenient handling and baling. The resulting pieces of dry rubber 68 normally fall downward through chute 60 after passing through open gate 61. A screw conveyor 62 extends horizontally in conduit 63 from the base of chute 60 to the bottom of a bucket type vertical conveyor 64 which is mounted in chute 65. The screw conveyor 62 may be driven by driving means (not shown) attached to the pulley portion 66 extending through chute 60, and the conveyor 64 may be driven by a roll 67. The pieces of rubber 68 falling down through chute 60 are passed through conduit 63 via screw conveyor 62 and deposited at the base of chute 65, where they are then removed by bucket conveyor 64 and passed upward to further processing and packaging in accordance with prior art practice. For example, the bucket conveyor 64 may feed automatic scales for a baler, and the resulting rubber bales may be examined for moisture, passed through metal detectors, and finally packaged for shipment.

Each of the drier zones 31, 44–47 and 56–59 is provided with a thermometer 70 arranged above the layer of rubber 17 so as to measure the temperature of the air after passing through the layer of drying rubber, and a thermometer 71 suitable for measuring the temperature of the rubber layer 17. The exit area 73 for the dried rubber 76 defined by baffles 74, 75 and 77 and the wall 78 of the drier 15, is also provided with a thermometer 80 for measuring the air temperature, and a thermometer 81 for measuring the temperature of the dried rubber 76, which may be similar to thermometers 70 and 71, respectively. The thermometers 70, 71, 80 and 81 may be of any suitable type. Preferably, the thermometers 70 and 80 are thermocouples, such as shown in the drawings, suspended in the atmosphere above the rubber layer. The thermometers 71 and 81 may be thermocouples arranged to drag through the moving layer of rubber 17, or thermocouples in the form of a floating roll which rolls along on the rubber surface. Preferably, the thermometers 81 are optical pyrometers, such as the infrared thermometers shown in the drawings, mounted outside of the drier in positions to detect the temperature of the sheet of rubber 17 at a desired point as noted in each of the drier zones. For example, as best seen in FIGURE 2, the wall 78 of drier 15 may be provided with an open slot or window 79 and the infrared thermometer 81 is mounted so as to be able to take the temperature of the rubber surface at point 83. A similar arrangement may be used for the thermometers 71, and the thermocouples 70 and 80 may be located immediately above the point where the line of sight for the infrared thermometers 71 and 81 hits the rubber, as illustrated in FIGURE 2.

The thermocouples 70 and 80 are provided with electrical leads 90 and 92 to devices 93 and 95, respectively, and similarly infrared thermometers 71 and 81 are provided with electrical leads 96 and 98 to devices 93 and 95, respectively. The devices 93 and 95 may be electronic transducers or other suitable apparatus for determining the temperature differential $\Delta t$ between the temperature of the air at the location of the thermocouples 70 and 80, and the temperature of the rubber in the vicinity of these points. The devices 93 and 95 are also designed to produce and pass a $\Delta t$ output, which is the temperature differential above mentioned, via electrical leads 100 and 102, respectively, to drier controller 103.

The drier controller 103 is a prior art device designed to aid in controlling the temperature in each of the drier zones 31, 44–47 and 56–59, and the speed of the drier flights 18, 19 and 20 based upon the information received via leads 100 and 102, i.e., the temperature differential $\Delta t$ at points 83 and 85. Thus, drier controller 103 may change the speed of transverse movement of drier flights 18, 19 and 20 and vary the drying time of the rubber layer 17 by means of an electrical output signal fed via electrical lead 104 to variable drive control 105. The variable drive control 105 responds by determining the speed by means of electrical output signals fed via electrical leads 110, at which motors 106 drive the drier flights 18, 19 and 20 by means of linkages 107, 108 and 109 to drive means 21, 22 and 23, respectively. The variable drive control 105 may be capable through leads 110, motors 106 and connections 107, 108 and 109, of driving the drier flights 18, 19 and 20 at the same speed or at different speeds. For instance, where the rubber 17 has been dried substantially completely by the time it reaches drier flight 20, then it may be desirable to speed up drier flight 20 and deposit the fully dried rubber 76 in chute 60 at a more rapid pace than in normal operation. This will aid in preventing deterioration of the rubber due to overdrying at elevated temperatures.

The controller 103 also determines through apparatus associated therewith, the proper temperature of the atmosphere within the drier zones 31, 44–47 and 56–59. For example, since the amount of hot air fed to the various drier zones is determined by the positions of remote control valves 38 in conduits 35, the temperature in each zone may be controlled by means of electrical output signals from controller 103 via electrical leads 112 to remote control valves 38. If desired, the temperature also may be controlled in a similar manner by varying the temperature of a relatively constant feed of air to the drier zones.

FIGURE 3 of the drawings graphically illustrates the manner in which the temperature differential $\Delta t$ and the moisture content may vary with the drying time of relatively porous and relatively nonporous synthetic rubber crumb. The progress of the drying step may be followed by determining the temperature differential $\Delta t$ between the air and the rubber in the various zones of the drier 15. While the numerical values in FIGURE 3 are given by way of example only, it may be noted that the moisture content of the wet synthetic rubber crumb decreases with increasing drying time and may vary from about 40% by weight to about 0% by weight, as is illustrated by curve 115.

The manner in which the temperature differential Δt varies with drying time and with respect to moisture content is illustrated for a relatively porous rubber crumb such as carbon black masterbatch by curve 116. It may be noted that the initial value for Δt may be approximately 65° C., it drops rapidly to approximately 52–55° C. as the crumb is heated, then remains substantially constant until the moisture content of the rubber approximates a low equilibrium moisture content which is near zero at the point 117, and falls rapidly from the point 117 where Δt has a value of approximately 52 to the point 118 where Δt has a value of approximately zero. Thus, in instances where black masterbatch is dried in the oven, the drying time interval indicated by the point 119 may be used to control the amount of moisture in the drying rubber. However, as a practical matter, it is often desirable to set the drying time at about the point indicated at 120 so as to assure that the rubber will be completely dried in instances where the moisture content varies somewhat. Therefore, the dried controller 103 may be set maintain a final value for Δt in zone 73 approximating that at point 121 on curve 116, and control either the speed of the dried flights and/or the temperature in the drier zones to achieve this Δt value for zone 73. Operating in this manner will avoid the unnecessarily long drying time of the prior art, which is illustrated by the point 122.

When drying a relatively nonporous rubber such as unpigmented synthetic rubber crumb which has not been subjected to a French oil mill processing step or equivalent processing to increase the porosity, a different slope for the Δt curve is usually obtained. Nevertheless, the value for Δt may be used for the control of the drier. The Δt curve 123 for the nonporous rubber crumb initially approximates that for the porous rubber up until point 124, and then the Δt value drops progressively with increasing drying time even though a substantial amount of moisture remains in the rubber. For a given synthetic rubber crumb which is being processed continuously, this drop in Δt value is characteristic and reproducible, and thus may be used in the same manner as the Δt value for curve 116. For instance, the Δt value existing at point 125 indicates that substantially no moisture remains in the crumb, and this value may be used as the end value in zone 73 for terminating the drying. As is true of porous rubber, in usual operation it is desirable to continue the drying step for a few minutes longer, and thereby compensate for variations in the moisture content of the crumb from run to run. Thus, the drying may be continued until the end Δt value in zone 73 approximates that at point 126, at which time the drying is terminated.

The Δt values that are often used for controlling the drier are those for zone 73. However, with experience gained in operating the drier on a given type of synthetic rubber, it is also possible to use Δt values for other drier zones which fall along the curves 116 and 123 and which aret normal in the drying cycle for the given drier zone. Also, in instances where a Δt value for a drying zone indicates that the rubber is not being dried sufficiently rapid, then the controller 103 may increase the temperature therein or in preceding or succeeding drier zones to assure that the rubber is thoroughly dried by the time it reaches zone 73. Therefore, the operation of the entire drier may be controlled in a convenient and efficient manner so as to assure a minimum drying time for the rubber, and also so as to assure that the rubber is sufficiently dried and has a uniform moisture content by the time it reaches zone 73. The moisture content may be controlled within very narrow limits from run to run and this has the added advantage of allowing the customer to more carefully and completely control his processing variables. As is well known, the moisture content of rubber affects the curing rate and other processing steps.

In instances where the moisture content of the rubber is not sufficiently low by the time it reaches zone 73, then this may be determined either by observing the temperature of the rubber directly by means of infrared thermometer 81, or the Δt value obtained for the drier zone 73. In either instance, an electrical signal is produced by device 95 and passed via electrical leads 130 and 131 to motor 132, which then operates the gate 61 by means of connection 133 and moves it to the recycle position illustrated at 134. Device 95 also produces another electrical signal which is transmitted via electrical lead 113 to horn 114, thereby causing it to blow and signal the operator. The rubber crumb 68 is free to fall down recycle chute 135 onto conveyor 136, which transfers it to bucket conveyor 137. The bucket conveyor 137 passes the wet crumb upward and discharges it upon baffle 138, where it is passed downward onto baffle 52 and mixes with the rubber being deposited upon the drier flight 20. Thus, the wet rubber is passed once again through drier zones 57, 58 and 59, and is completely dried. The electrical signal passed via lead 130 also passes on to time delay device 141, which in turn passes an electrical signal via electrical lead 142 to motor 143. The motor 143 drives the conveyor 136 by means of a connection 144. The time delay device 141 assures that the motor 143 continues to drive the conveyor 136 for a sufficient period of time after returning gate 61 to the normal position to transfer the rubber deposited thereon to the bucket conveyor 137. The bucket conveyor 137 is driven by drive means not shown in the interest of clarity in a manner similar to bucket conveyor 64, and the drive means is rendered operative only when conveyor 136 is running.

After the Δt value or direct temperature measurement above referred to have returned to the observed normal for the rubber being dried and the values once again indicate that the rubber particles 68 are dried, then the electrical signal is no longer transmitted from device 95 via lead 130, and the gate 61 is returned from the position 134 to the normal closed position. If desired, a contact thermometer 145 may be positioned at the end of screw 62, and temperature data is fed therefrom in the form of an electrical signal via lead 146 to device 95. This temperature information also may be used to produce the electrical signal flowing in lead 130 when the temperature of the dried rubber is lower than that for the observed normal value and wet rubber is indicated. This is more efficient in some instances, and especially where the layer of rubber 76 has a substantial depth. Often, wet spots may be located beneath the surface of the rubber 76, and go undetected by infrared thermometer 81. However, after disintegrating the rubber layer into small particles, the wet rubber would be easily detected due to its low temperature, which is substantially lower than the observed normal for the particular rubber being dried.

The apparatus and method of the invention may be used in drying a wide variety of wet synethic rubbery polymers, and especially crumb rubber that is produced by coagulation of synthetic rubber latex. The synthetic rubber latex may be produced by emulsion polymerization processes well known to the art. Examples of polymerizable materials for use in preparing the latex are the various 1,3-butadienes, such as 1,3-butadiene, methyl-2-butadiene-1,3-piperylene, and 2,3-dimethyl butadiene-1,3. If desired, the polymerizable material may be a mixture of a 1,3-butadiene, such as 1,3-butadiene, with another polymerizable compound which is capable of forming rubbery copolymers therewith. For example, such polymerizable mixtures may contain up to 50% or higher of a compound which contains a $CH_2=C=$ group, wherein at least one of the disconnected valences is attached to an electroactive group. Examples of compounds containing the aforementioned electroactive group and copolymerizable with the 1,3-butadienes are the aryl olefins, such as styrene and vinyl naphthalene; the alpha methylene carboxylic acids, and their esters, nitriles, and amides, such as acrylic acid, methyl acrylate, methyl methacrylate, acrylonitrile, and methacrylamide; isobutylene, methyl vinyl ether; and methyl vinyl ketone. Such synthetic rubbers may be referred to herein as being rubbery homopolymers of conjugated diolefins and rubbery copolymers of conjugated diolefins and monoethylenically unsaturated monomers. The preferred synthetic rubber is prepared from butadiene and styrene, wherein the styrene content by weight is less than 50%. It is also possible to dry synthetic resinous polymers in accordance with the invention, such as polymers containing 50–99% by weight of the compound containing the $CH_2=C=$ group, or even homopolymers thereof such as polystyrene.

The foregoing synthetic rubbery polymers may be dried in the pigmented or unpigmented state. However, unpigmented crumb tends to be nonporous, and it is usually preferred that a porous rubbery polymer crumb such as styrene-butadiene carbon black masterbatch be dried. If desired, the porosity of nonpigmented crumb may be improved by processing it in a French oil mill, or in other similar apparatus wherein the wet rubbery polymer crumb is subjected to high pressure and shearing forces at temperatures above the boiling point of the water at normal atmospheric pressure, and is then extruded into a lower pressure zone in which the water content of the polymer immediately changes to steam and thereby expands the polymer crumb.

In instances where a relatively porous synthetic rubber crumb is being dried, then $\Delta t$ values approximating 5–52° C. are usually used as a setting for controller 103 and/or for controlling recycle of wet rubber, and especially $\Delta t$ values between about 10° C. and 45° C. However, the specific $\Delta t$ value which is employed will vary somewhat with the desired moisture content in the rubber. In instances where nonpigmented and relatively nonporous rubbery polymer crumb is being dried, then the preferred $\Delta t$ values will be somewhat lower such as 5–25° C. or below. In instances where the moisture content is to be controlled at 0.5% by weight or lower, then $\Delta t$ values of 10–15° C. or lower are often preferred.

The drying gases, the drying temperature ranges and the drying times of the prior art may be used, if desired. However, preferably the conditions with respect to temperature and time are controlled so as to assure that a product having a uniformly low moisture content is produced in a minimum driving time.

The device 95 is a well known prior art instrument which includes means such as a differential thermocouple for determining the difference between the temperatures measured by thermocouple 80 and infrared thermometer 81 and producing an electrical signal corresponding to the resulting $\Delta t$ value. The devices 93 may be prior art instruments which include means such as a differential thermocouple for determining the difference between the temperatures measured in the respective drier zones by thermocouples 70 and infrared thermometer 71 and producing electrical signals corresponding to the resulting $\Delta t$ values. The device 95 also includes prior art means for sensing an error in the selected $\Delta t$ value, or in the direct temperature of the rubber as measured by infrared thermometer 81 or contact thermometer 145, and for producing an electrical signal in response thereto for blowing horn 114 and for transmitting along lead 130 to thereby operate gate 61 and the associated wet rubber recycle apparatus. The time delay 141 is a prior art device including means for producing and transmitting an electrical signal to motor 143 for a desired period of time after the electrical signal passing along lead 130 has been terminated, thereby causing the motor 143 to drive conveyor 136 until the wet rubber thereon is recycled back to the drier. The drier controller 103 is a prior art programmer including means for sensing errors in the selected $\Delta t$ values fed thereto, and means for producing and transmitting electrical signals to the remote control valves and/or drier flight driers in response thereto and thereby restoring the temperature differentials $\Delta t$ to the selected values.

While the drier 15 is preferably controlled automatically by control apparatus as discussed herein, it is also possible to perform one or more functions thereof by hand. For example, the oven atmosphere temperature and rubber temperature may be observed, the $\Delta t$ value calculated, and the $\Delta t$ value or the direct temperature of the rubber used to determine when to operate hand operated controls for changing the temperature in the drier zones, the speed of the drier flights and/or the recycle of wet rubber.

The foregoing detailed description, the drawings and the following specific examples are by way of illustration only, and are not intended as being limiting to the spirit or scope of the appended claims.

*Example I*

This example illustrates the drying on a laboratory scale of a prior art carbon black masterbatch of a rubbery copolymer of styrene and butadiene. The polymer was in the form of wet porous crumb received from a prior art coagulation process in which an aqueous mixture containing the styrene-butadiene latex, oil emulsion and carbon black slurry was coagulated by addition of aqueous sulfuric acid, and the resulting coagulum washed and dewatered.

A No. 12 (U.S. Standard) sieve was used to contain the crumb during the drying operation. This container gave a crumb bed approximately 8" in diameter and 2" thick. The crumb was dried in a Precision Scientific Co. Model 18 forced air oven. Measurements of the temperature differential, $\Delta t$, were made with a differential arrangement of two iron-constantan thermocouples in which one thermocouple was inserted into a crub particle located in the center of the crub bed and the other thermocouple was located in the drying air of the oven approximately 5" over the crumb bed. Output of the differential thermocouple was measured with a Leeds and Northrup potentiometer. The drying oven temperature was maintained at 97° C.

The temperature differential, $\Delta t$, which is the difference between the temperature of the oven atmosphere and the crumb temperature, and the moisture content of the crumb rubber were determined at varying drying time intervals to thereby follow the progress of the drying step. The following data were obtained:

TABLE I

| Drying Time (Minutes): | Moisture Content of the Rubber (Percent by Weight) | $\Delta t$ (° C.) |
| --- | --- | --- |
| 15 | 43.4 | 56.2 |
| 60 | 38.0 | 51.9 |
| 95 | 30.9 | 52.4 |
| 125 | 20.2 | 52.0 |
| 155 | 11.5 | 52.0 |
| 180 | 6.73 | 52.4 |
| 205 | 3.00 | 52.6 |
| 230 | 0.22 | 55.0 |
| 265 | 0.09 | 51.2 |
| 290 | Nil | 47.0 |
| 312 | Nil | 40.2 |
| 330 | Nil | 22.0 |
| 341 | | 11.0 |
| 370 | | 2.0 |

The above data show that the temperature differential, $\Delta t$, remains substantially constant and high during the initial portion of the drying step when a substantial amount of unbound moisture is present. As the unbound moisture content drops to approximately 0.09–0.22% then the value of $\Delta t$ commences falling somewhat, and thereafter rapidly approaches zero as the moisture content decreases to nil.

*Example II*

This example illustrates the drying of a prior art nonpigmented rubbery copolymer of styrene and butadiene which was relatively nonporous, as compared with the carbon black masterbatch of Example I. The general procedure of Example I was otherwise followed. The following data were obtained:

TABLE II

| Drying Time (Minutes): | Moisture Content of the Rubber (Percent by Weight) | Δt (° C.) |
|---|---|---|
| 10 | 30.9 | 56.3 |
| 35 | 24.1 | 52.2 |
| 60 | 19.7 | 54.0 |
| 85 | 15.9 | 56.5 |
| 100 | 13.6 | 57.0 |
| 120 | 11.9 | 52.1 |
| 145 | 6.3 | 42.9 |
| 205 | 0.6 | 20.9 |
| 245 | 0.002 | 13 |
| 300 |  | 6.2 |

From the above data, it may be seen that the rate of drying and the moisture content of nonpigmented and relatively nonporous rubber crumb also may be determined from the Δt value. However, the Δt curve is substantially different as the Δt value remains high and constant for a shorter period of time compared to the Δt curve obtained in Example I and begins falling sharply while the polymer still has a relatively high moisture content of 15–20%. The moisture content is reduced to or below the desired maximum of 0.5% before Δt decreases lower than about 15–20° C.

*Example III*

This example illustrates the drying of wet crumb of a prior art carbon black masterbatch of a rubbery copolymer of styrene and butadiene in equipment similar to that illustrated in FIGURES 1 and 2 of the drawings. The average drying characteristics of the polymer crumb and the efficiency of the dryer are similar to those in Example I.

The wet crumb containing about 48% by weight of water is fed to the drier flight 18 and deposited thereon in the form of a layer. The drier zones are maintained at a controlled temperature by feeding dry hot air thereto via the conduits 33 and headers 32. The drier flights 18, 19 and 20 are operated at a speed such that a total drying time of about 310 minutes is obtained, at the expiration of which time the dried rubber reaches the exit zone 73.

The drier controller 103 is set to control the drying temperature such that a Δt of 41° C. is maintained on the system at the termination of the drying operation. Under normal operating conditions this drying temperature is approximately 97° C. The alarm 114 and recycle gate 61 are set by appropriate circuitry in 95 to be actuated at a Δt of approximately 52° C.

In instances where minor variations in the drying rate occur, Δt will increase or decrease corresponding to decreasing or increasing drying rates of the polymer crumb. Controller 103 reacts to these variations in Δt to increase or decrease the drying temperature via control values 38 to maintain the 41° C. Δt set point. Where major upsets in drying conditions occur which cannot be controlled by the previously described control action, Δt may rise as high as 52° C. at which temperature alarm 114 is activated and recycle gate 61 is closed to recycle the wet crumb for additional drying. Thus, no rubber is produced with a moisture content greater than approximately 0.09%.

In an uncontrolled drying operation in which the drying temperature is fixed, drying characteristics of the polymer may vary such that drying times of from 230 to 350 minutes are required to completely dry the rubber. Under these conditions the maximum time must be routinely used and the polymer crumb would remain in the drier at high drying temperatures for an average of 60 minutes and as long as 120 minutes past the time where moisture has been reduced to near zero. In the controlled operation of this example, the polymer crumb remains in the drier for only approximately 20 minutes past the time the trace moisture extrapolates to zero. Thus the deleterious effect of the hot drying air is reduced considerably.

What is claimed is:

1. A method of drying wet synthetic rubber comprising the steps of intimately contacting the wet synthetic rubber with a gaseous medium heated to an elevated temperature at which heat is transferred by convection from the gaseous medium to the wet synthetic rubber and water is evaporated to thereby dry the rubber, the gaseous medium having a relative humidity less than 100% initially, measuring the temperature of the rubber while it is being dried, and controlling the drying of the rubber in response to changes in the temperature as the moisture content is reduced.

2. A method of drying wet synthetic rubber comprising the steps of intimately contacting the wet synthetic rubber with a gaseous medium heated to an elevated temperature at which heat is transferred by convection from the gaseous medium to the wet synthetic rubber and water is evaporated to thereby dry the rubber, the gaseous medium having a relative humidity less than 100% initially and being substantially nondeleterious to the synthetic rubber under the conditions of drying, measuring the temperature of the synthetic rubber while it is being dried and controlling the drying of the synthetic rubber in response to an increase in the temperature of the synthetic rubber as the moisture content is reduced.

3. A method of drying wet synthetic rubber comprising the steps of contacting the wet synthetic rubber with a gaseous medium heated to an elevated temperature at which water is evaporated and the rubber is dried, the gaseous medium having a relative humidity less than 100% initially and being substantially nondeleterious to the synthetic rubber under the conditions of drying, measuring the temperature of the gaseous medium, measuring the temperature of the synthetic rubber contacted with the gaseous medium, determining the difference between the temperature of the synthetic rubber and that of the gaseous medium to obtain the temperature differential Δt, and terminating the drying of the rubber when it is dried to a desired moisture content as shown by the value for the temperature differential Δt.

4. The method of claim 3 wherein the dried synthetic rubber is monitored for excessive moisture content by measuring the temperature thereof.

5. The method of claim 3 wherein the synthetic rubber is a carbon black masterbatch.

6. The method of claim 5 wherein the gaseous medium contacted with the synthetic rubber is air.

7. A method of drying wet synthetic rubber crumb comprising the steps of placing a layer of the wet synthetic rubber crumb on a conveyor, passing the layer of crumb through an open, passing a gaseous medium heated to an elevated temperature in intimate contact with the layer of crumb while in the oven whereby the crumb is heated to an elevated temperature at which water is evaporated and dried, the gaseous medium having a relative humidity less than 100% initially and being substantially nondeleterious to the synthetic rubber under the conditions of drying, measuring the temperature of the gaseous medium after it has been contacted with the synthetic rubber, measuring the temperature of the synthetic rubber after it has been contacted with the gaseous medium, determining the difference between the temperature of the gaseous medium and the temperature of the synthetic rubber to obtain the temperature differential Δt, and withdrawing the synthetic rubber crumb from the oven when it is dried to a desired moisture content as shown by the temperature differential Δt.

8. The method of claim 7 wherein the crumb is passed through a plurality of zones in the oven and the temperature in at least one zone is varied in response to changes in the temperature differential Δt.

9. The method of claim 8 wherein the synthetic rubber crumb is recycled to the oven for additional drying when it is not sufficiently dry as shown by the temperature differential Δt.

10. The method of claim 7 wherein the speed of the conveyor is varied while in the oven in response to a change in the temperature differential Δt.

11. The method of claim 7 wherein the crumb is passed through a plurality of zones in the oven and the temperature in at least one zone and the speed of the conveyor are varied in response to a change in the temperature differential Δt.

12. A method of drying wet synthetic rubber crumb comprising the steps of placing a layer of the wet synthetic rubber crumb on top of a continuously moving perforated conveyor which passes through an oven, passing the layer of wet crumb through the oven, the oven being divided into a plurality of zones and the crumb being passed consecutively and continuously through the plurality of zones, continuously passing air heated to an elevated temperature into the said plurality of zones and intimately contacting it with the crumb whereby it is heated to an elevated temperature at which water is evaporated and dried, the air being passed upward through the said perforations in the conveyor and the layer of crumb, the air having initially a relative humidity less than 100% and being substantially nondeleterious to the synthetic rubber under the conditions of drying, continuously measuring the temperature of the air in a plurality of the said zones, the temperature of the air being measured after passing through the layer of crumb on the conveyor, continuously measuring the temperature of the crumb in a plurality of the said zones, determining the difference between the said temperatures of the air and the layer of crumb in a plurality of the zones to obtain the temperature differential Δt for each of the zones, and withdrawing the synthetic rubber crumb from the oven when it is dried to a desired moisture content as shown by the temperature differential Δt for at least one of the zones.

13. The method of claim 12 wherein the temperature in at least one zone of the oven is varied in response to changes in the temperature differential Δt.

14. The method of claim 12 wherein the speed of the conveyor is varied in response to changes in the temperature differential Δt.

15. Apparatus for drying wet synthetic rubber comprising means for intimately contacting wet synthetic rubber with a gaseous medium heated to an elevated temperature at which water is evaporated and the rubber is dried, means for measuring the temperature of the gaseous medium contacted with the synthetic rubber, means for measuring the temperature of the synthetic rubber contacted with the gaseous medium, and means for terminating the drying of the synthetic rubber after it is dried to a desired moisture content as determined by the difference between the temperature of the gaseous medium and the temperature of the synthetic rubber.

16. The apparatus of claim 15 wherein means is provided for monitoring the dried synthetic rubber for excessive moisture content including means for measuring the temperature thereof.

17. Apparatus for drying wet synthetic rubber crumb comprising means for placing a layer of wet synthetic rubber crumb on a conveyor passing into an oven, means for driving the conveyor, means for passing a gaseous medium heated to an elevated temperature into intimate contact with the said layer of synthetic rubber crumb on the conveyor whereby it is heated to an elevated temperature at which water is evaporated and dried, means for measuring the temperature of the gaseous medium after it has been contacted with the synthetic rubber, means for measuring the temperature of the synthetic rubber crumb after it has been contacted with the gaseous medium, means for determining the difference between the said temperature of the gaseous medium and the synthetic rubber crumb to obtain the temperature differential Δt, and means for withdrawing the synthetic rubber crumb from the oven after it is dried to a desired moisture content as shown by the temperature differential Δt.

18. Apparatus for drying wet synthetic rubber crumb comprising means for placing a layer of wet synthetic rubber crumb on a continuously moving perforated conveyor passing through an oven, means for continuously driving the conveyor, the oven being divided into a plurality of separate zones and the synthetic rubber crumb being passed consecutively through the said plurality of zones, means for continuously passing air heated to an elevated temperature into the said plurality of zones and intimately contacting it with the synthetic rubber crumb whereby it is heated to an elevated temperature at which water is evaporated and dried, the air being passed upward through the said perforations in the conveyor and the layer of synthetic rubber thereon, the air having initially a relative humidity less than 100% and being substantially nondeleterious to the synthetic rubber under the conditions of drying, means for measuring the temperature of the air in a plurality of the zones, the temperature of the air being measured after passing through the layer of synthetic rubber on the conveyor, means for continuously measuring the temperature of the synthetic rubber in a plurality of the zones, means for determining the difference between the said temperature of the gaseous medium and the synthetic rubber in a plurality of the zones to obtain the temperature differential Δt for each of the said plurality of zones, and means for withdrawing the synthetic rubber crumb from the oven after it is dried to a desired moisture content as shown by the temperature differential Δt.

19. The apparatus of claim 18 wherein means is provided for varying the temperature in at least one zone of the oven in response to a change in the temperature differential Δt.

20. The apparatus of claim 18 wherein means is provided for varying the speed of the conveyor in response to a change in the temperature differential Δt.

21. The apparatus of claim 18 wherein means is provided for recycling synthetic rubber to the oven for additional drying when it is not sufficiently dry as shown by the temperature thereof.

References Cited
UNITED STATES PATENTS

| | | | |
|---|---|---|---|
| 2,874,482 | 2/1959 | Haltmeier | 34—31 |
| 3,013,785 | 12/1961 | King | 34—48 X |
| 3,102,795 | 9/1963 | Andrews et al. | 34—33 |
| 3,259,995 | 7/1966 | Powischill | 34—31 |

KENNETH W. SPRAGUE, *Primary Examiner.*

UNITED STATES PATENT OFFICE
CERTIFICATE OF CORRECTION

Patent No. 3,367,038                     February 6, 1968

William A. Bishop, Sr.

It is hereby certified that error appears in the above numbered patent requiring correction and that the said Letters Patent should read as corrected below.

Column 5, line 20, after "set" insert -- to --; line 56, for "aret" read -- are --; column 7, line 44, for "driving" read -- drying --; column 8, lines 33 and 34, for "crub", each occurrence, read -- crumb --; column 9, TABLE II, last column, line 9 thereof, for "13" read -- 13.7 --; column 10, line 57, for "open" read -- oven --.

Signed and sealed this 22nd day of April 1969.

(SEAL)

Attest:

Edward M. Fletcher, Jr.

Attesting Officer

EDWARD J. BRENNER

Commissioner of Patents